United States Patent
Xu et al.

(10) Patent No.: US 11,307,546 B2
(45) Date of Patent: Apr. 19, 2022

(54) APPLIANCE, METHOD AND SYSTEM FOR CONTROLLING THE SAME, SERVER AND APPLIANCE CONTROLLING APPARATUS

(71) Applicant: MIDEA ROBOZONE TECHNOLOGY CO., LTD., Suzhou (CN)

(72) Inventors: Xiaoming Xu, Suzhou (CN); Ke Li, Suzhou (CN); Lei Gao, Suzhou (CN); Shuping Sun, Suzhou (CN)

( * ) Notice: Subject to any disclaimer, the term of this patent is extended or adjusted under 35 U.S.C. 154(b) by 252 days.

(21) Appl. No.: 16/718,184

(22) Filed: Dec. 18, 2019

(65) Prior Publication Data

US 2020/0209819 A1 Jul. 2, 2020

(30) Foreign Application Priority Data

Dec. 27, 2018 (CN) .......................... 201811612950.4

(51) Int. Cl.
*G05B 19/042* (2006.01)
*G06N 20/00* (2019.01)

(52) U.S. Cl.
CPC .......... *G05B 19/042* (2013.01); *G06N 20/00* (2019.01); *G05B 2219/23027* (2013.01)

(58) Field of Classification Search
None
See application file for complete search history.

(56) References Cited

U.S. PATENT DOCUMENTS

2016/0047662 A1* 2/2016 Ricci .................... B60N 2/0244
701/540
2016/0075015 A1* 3/2016 Izhikevich ............... B25J 9/163
700/253
(Continued)

FOREIGN PATENT DOCUMENTS

CN 102006183 A 4/2011
CN 104349471 A 2/2015
(Continued)

OTHER PUBLICATIONS

Arumugam et al., "DAvinCi: A Cloud Computing Framework for Service Robots," IEEE, 2010, 6pg. (Year: 2010).*
(Continued)

*Primary Examiner* — Ryan D. Coyer
(74) *Attorney, Agent, or Firm* — Kilpatrick Townsend & Stockton, LLP

(57) ABSTRACT

An appliance, a method and system for controlling the same, a server, an appliance controlling apparatus are provided. The method for controlling an appliance includes: receiving a parameter acquiring request transmitted by the appliance or an appliance controlling apparatus, the parameter acquiring request including an identifier of the appliance; acquiring a recommended parameter configuration list corresponding to the identifier of the appliance according to the parameter acquiring request; and transmitting the recommended parameter configuration list to the appliance or the appliance controlling apparatus enables the appliance to run according to the recommended parameter configuration list or enable the appliance controlling apparatus to control running of the appliance according to the recommended parameter configuration list.

15 Claims, 3 Drawing Sheets

```
S1: receiving a parameter acquiring request transmitted by the appliance or an appliance
controlling apparatus, the parameter acquiring request comprising an identifier of
the appliance S2: acquiring a recommended parameter configuration list corresponding to the
identifier of the appliance according to the parameter acquiring request S3: transmitting the recommended parameter configuration list to the appliance or the
appliance controlling apparatus, so as to enable the appliance to run according to the
recommended parameter configuration list or enable the appliance controlling
apparatus to control running of the appliance according to the recommended
parameter configuration list
```

(56) References Cited

U.S. PATENT DOCUMENTS

| | | | |
|---|---|---|---|
| 2017/0112345 | A1 | 4/2017 | Frey |
| 2017/0134538 | A1 | 5/2017 | Mahkonen et al. |
| 2018/0117769 | A1* | 5/2018 | Delazari Binotto ... B25J 11/001 |
| 2018/0240010 | A1 | 8/2018 | Faivishevsky et al. |
| 2018/0285463 | A1* | 10/2018 | Choi .................. G06F 16/9535 |
| 2018/0299899 | A1* | 10/2018 | Suvarna ................ A47L 9/2894 |
| 2018/0348783 | A1 | 12/2018 | Pitzer et al. |
| 2018/0353042 | A1 | 12/2018 | Gil et al. |
| 2019/0196430 | A1* | 6/2019 | Seo .................... G05B 19/0428 |
| 2020/0244476 | A1* | 7/2020 | Kim ....................... G06Q 50/10 |

FOREIGN PATENT DOCUMENTS

| | | |
|---|---|---|
| CN | 104777756 A | 7/2015 |
| CN | 104898447 A | 9/2015 |
| CN | 104965416 A | 10/2015 |
| CN | 106161096 A | 11/2016 |
| CN | 107741084 A | 2/2018 |
| CN | 107784538 A | 3/2018 |
| CN | 107942711 A | 4/2018 |
| CN | 108052014 A | 5/2018 |
| CN | 108469740 A | 8/2018 |
| CN | 108922624 A | 11/2018 |

OTHER PUBLICATIONS

Doriya et al., "Robotic Services in Cloud Computing Paradigm," IEEE, 2012, 4pg. (Year: 2012).*
Mohanarajah, et al., "Rapyuta: A Cloud Robotics Platform," IEEE, 2015, 13pg. (Year: 2015).*
First OA for CN application 201811612950.4.
First OA for EP application 19213975.6.
Third OA for EP application 19213975.6.
OA for EP application 19213975.6.
Second OA for CN application No. 201811612950.4.

* cited by examiner

APPLIANCE, METHOD AND SYSTEM FOR CONTROLLING THE SAME, SERVER AND APPLIANCE CONTROLLING APPARATUS

CROSS-REFERENCES TO RELATED APPLICATIONS

This application claims priority to Chinese Patent Application No. 201811612950.4 filed on Dec. 27, 2018, the disclosure of which is hereby incorporated by reference in its entirety.

FIELD

The present disclosure relates to the field of appliances, and more particularly to an appliance, a method and system for controlling the same, a server, and an appliance controlling apparatus.

BACKGROUND

With the improvement of people's living quality, more and more functions are integrated in an appliance, and correspondingly, more and more parameters need to be configured. However, different user requirements for scenarios will lead to differences in parameter configuration, and the user experience will be poor if the user needs to manually configure respective parameters for different scenarios or needs to manually adjust the parameter due to the difference between the scenario configuration and the user expectation.

SUMMARY

Embodiments of the present disclosure seek to solve at least one of the problems existing in the related art to at least some extent.

One embodiment of the present disclosure is to provide a method for controlling an appliance, which can provide the appliance with a recommended parameter configuration list, to enable the appliance to run according to the recommended parameter configuration list. In this way, there is no need for the user to manually configure individual parameters of the appliance, to make the appliance more intelligent to achieve a better using effect, and improving the user experience at the same time.

One embodiment of the present disclosure is to provide another method for controlling an appliance.

One embodiment of the present disclosure is to provide yet another method for controlling an appliance.

One embodiment of the present disclosure is to provide a server.

One embodiment of the present disclosure is to provide an appliance.

One embodiment of the present disclosure is to provide an appliance controlling apparatus.

One embodiment of the present disclosure is to provide a system for controlling an appliance.

One embodiment of the present disclosure is to provide an electronic device.

One embodiment of the present disclosure is to provide a non-transitory computer-readable storage medium.

Embodiments of the present disclosure provides method for controlling an appliance, which includes: receiving a parameter acquiring request transmitted by the appliance or an appliance controlling apparatus, the parameter acquiring request including an identifier of the appliance; acquiring a recommended parameter configuration list corresponding to the identifier of the appliance according to the parameter acquiring request; and transmitting the recommended parameter configuration list to the appliance or the appliance controlling apparatus, to enable the appliance to run according to the recommended parameter configuration list or enable the appliance controlling apparatus to control running of the appliance according to the recommended parameter configuration list.

With the method for controlling the appliance according to embodiments of the present disclosure, the parameter acquiring request transmitted by the appliance or the appliance controlling apparatus is received first, the parameter acquiring request includes the identifier of the appliance; and then the recommended parameter configuration list corresponding to the identifier of the appliance is acquired according to the parameter acquiring request; finally, the recommended parameter configuration list is transmitted to the appliance or the appliance controlling apparatus, to enable the appliance to run according to the recommended parameter configuration list or enable the appliance controlling apparatus to control running of the appliance according to the recommended parameter configuration list. In this way, the recommended parameter configuration list can be provided for the appliance, to enable the appliance to run according to the recommended parameter configuration list, and there is no need for the user to manually configure individual parameters of the appliance, to make the appliance more intelligent to achieve a better using effect, and improving the user experience at the same time.

In an embodiment of the present disclosure, the above method further includes: generating the recommended parameter configuration list based on a machine learning model corresponding to the identifier of the appliance.

In an embodiment of the present disclosure, the machine learning model includes a universal machine learning model and a personalized machine learning model, the recommended parameter configuration list includes a universal recommended parameter configuration list and a personalized recommended parameter configuration list, and generating the recommended parameter configuration list based on the machine learning model corresponding to the identifier of the appliance includes: generating the personalized recommended parameter configuration list based on the personalized machine learning model corresponding to the identifier of the appliance, when the personalized machine learning model corresponding to the identifier of the appliance is stored; or generating the universal recommended parameter configuration list based on the universal machine learning model, when the personalized machine learning model corresponding to the identifier of the appliance is not stored.

In an embodiment of the present disclosure, the machine learning model includes a universal machine learning model and a personalized machine learning model, and the method further includes: receiving, from the appliance, a user-modified appliance parameter; and generating the personalized machine learning model according to the user-modified appliance parameter and based on the universal machine learning model; or updating the personalized machine learning model stored, according to the user-modified appliance parameter.

In an embodiment of the present disclosure, the machine learning model includes a universal machine learning model and a personalized machine learning model, and the method further includes: receiving, from the appliance controlling apparatus, user operation information and a user-modified appliance parameter; and generating the personalized machine learning model according to the user operation information and the user-modified appliance parameter and based on the universal machine learning model; or updating the personalized machine learning model stored, according to the user operation information and the user-modified appliance parameter.

In an embodiment of the present disclosure, the machine learning model includes a universal machine learning model and a personalized machine learning model, and the method further includes: training historical appliance parameters or training the historical appliance parameters and scenario data to obtain the universal machine learning model; training historical appliance parameters and any one or more selected from user operation information, user-modified appliance parameters and scenario data to obtain the personalized machine learning model.

In an embodiment of the present disclosure, the user operation information includes any one or more selected from: operation time, operation sequence and operation frequency.

In an embodiment of the present disclosure, the method further includes: acquiring the scenario data corresponding to the appliance, and generating an updated universal recommended parameter configuration list according to the scenario data corresponding to the appliance and based on the universal machine learning model; and transmitting the updated universal recommended parameter configuration list to the appliance or the appliance controlling apparatus, to enable the appliance to run according to the updated universal recommended parameter configuration list or enable the appliance controlling apparatus to control running of the appliance according to the updated universal recommended parameter configuration list.

In an embodiment of the present disclosure, the scenario data includes any one or more selected from: geographical position data, seasonal data, weather data and time period data.

Embodiments of the present disclosure, provide another method for controlling an appliance, including: transmitting a parameter acquiring request to a server, the parameter acquiring request including an identifier of the appliance; receiving a recommended parameter configuration list corresponding to the identifier of the appliance and transmitted by the server; configuring respective appliance parameters according to the recommended parameter configuration list; and controlling the appliance to run according to the configured appliance parameters.

With the method for controlling an appliance according to embodiments of the present disclosure, the parameter acquiring request is transmitted to the server first, the parameter acquiring request includes the identifier of the appliance; and then the recommended parameter configuration list corresponding to the identifier of the appliance and transmitted by the server is received; finally, the respective appliance parameters are configured according to the recommended parameter configuration list, and the appliance is controlled to run according to the configured appliance parameters. In this way, the recommended parameter configuration list is acquired from the server as the feedback on the parameter acquiring request, to enable the appliance to run according to the recommended parameter configuration list, and there is no need for the user to manually configure individual parameters of the appliance, to make the appliance more intelligent to achieve a better using effect, and improving the user experience at the same time.

In an embodiment of the present disclosure, the method further includes: detecting whether the configured appliance parameter is modified by a user; and continuously controlling the appliance to run according to the configured appliance parameters, if the configured appliance parameter is not modified by the user; controlling the appliance to run according to a user-modified appliance parameter, and transmitting the user-modified appliance parameter to the sever, if the configured appliance parameter is modified by the user.

Embodiments of the present disclosure, provide yet another method for controlling an appliance, including: transmitting a parameter acquiring request to a server, the parameter acquiring request including an identifier of the appliance; receiving a recommended parameter configuration list corresponding to the identifier of the appliance and transmitted by the server; updating a recommended parameter configuration list previously stored according to the recommended parameter configuration list received; and controlling the appliance to run according to the updated recommended parameter configuration list.

With the method for controlling an appliance according to embodiments of the present disclosure, the parameter acquiring request is transmitted to the server first, the parameter acquiring request includes the identifier of the appliance; and then the recommended parameter configuration list corresponding to the identifier of the appliance and transmitted by the server is received; finally, the recommended parameter configuration list previously stored is updated according to the recommended parameter configuration list received, and the appliance is controlled to run according to the updated recommended parameter configuration list. In this way, the recommended parameter configuration list is acquired from the server as the feedback on the parameter acquiring request, to enable the appliance to run according to the recommended parameter configuration list, and there is no need for the user to manually configure individual parameters of the appliance, to make the appliance more intelligent to achieve a better using effect, and improving the user experience at the same time.

In an embodiment of the present disclosure, the method further includes: detecting whether an appliance parameter in the updated recommended parameter configuration list is modified by a user; and continuously controlling the appliance to run according to the updated recommended parameter configuration list, if the appliance parameter in the updated recommended parameter configuration list is not modified by the user; controlling the appliance to run according to a user-modified appliance parameter, and transmitting user operation information and the user-modified appliance parameter to the sever, if the appliance parameter in the updated recommended parameter configuration list is modified by the user.

In an embodiment of the present disclosure, the user operation information includes any one or more selected from: operation time, operation sequence and operation frequency.

Embodiments of the present disclosure provide a server, including: a receiving device, configured to receive a parameter acquiring request transmitted by an appliance or an appliance controlling apparatus, the parameter acquiring request including an identifier of the appliance; an acquiring device, configured to acquire a recommended parameter configuration list corresponding to the identifier of the appliance according to the parameter acquiring request; and a transmitting device, configured to transmit the recommended parameter configuration list to the appliance or the appliance controlling apparatus, to enable the appliance to run according to the recommended parameter configuration list or enable the appliance controlling apparatus to control running of the appliance according to the recommended parameter configuration list.

By receiving the parameter acquiring request transmitted by the appliance or the appliance controlling apparatus through the receiving device, the parameter acquiring request including the identifier of the appliance, acquiring through the acquiring device the recommended parameter configuration list corresponding to the identifier of the appliance according to the parameter acquiring request, and transmitting the recommended parameter configuration list to the appliance or the appliance controlling apparatus through the transmitting device, to enable the appliance to run according to the recommended parameter configuration list or enable the appliance controlling apparatus to control running of the appliance according to the recommended parameter configuration list, the server according to embodiments of the present disclosure is able to provide the recommended parameter configuration list for the appliance, to enable the appliance to run according to the recommended parameter configuration list, without needing the user to manually configure individual parameters of the appliance, to make the appliance more intelligent to achieve a better using effect, and improving the user experience at the same time.

Embodiments of the present disclosure, provide an appliance, including: a transmitting device, configured to transmit a parameter acquiring request to a server, the parameter acquiring request including an identifier of the appliance; a receiving device, configured to receive a recommended parameter configuration list corresponding to the identifier of the appliance and transmitted by the server; a configuration device, configured to configure respective appliance parameters according to the recommended parameter configuration list; and a controlling device, configured to control the appliance to run according to the configured appliance parameters.

By transmitting the parameter acquiring request to the server through the transmitting device, the parameter acquiring request including the identifier of the appliance, receiving through the receiving device the recommended parameter configuration list corresponding to the identifier of the appliance and transmitted by the server, configuring the respective appliance parameters according to the recommended parameter configuration list through the configuration device, and controlling the appliance to run according to the configured appliance parameters through the controlling device, the appliance according to embodiments of the present disclosure is able to acquire the recommended parameter configuration list from the server as the feedback on the parameter acquiring request, and run according to the recommended parameter configuration list, without needing the user to manually configure individual parameters of the appliance, to make the appliance more intelligent to achieve a better using effect, and improving the user experience at the same time.

Embodiments of the present disclosure, provide an appliance controlling apparatus, including: a transmitting device, configured to transmit a parameter acquiring request to a server, the parameter acquiring request including an identifier of the appliance; a receiving device, configured to receive a recommended parameter configuration list corresponding to the identifier of the appliance and transmitted by the server; an updating device, configured to update a recommended parameter configuration list stored previously according to the recommended parameter configuration list received; and a controlling device, configured to control the appliance to run according to the updated recommended parameter configuration list.

By transmitting the parameter acquiring request to the server through the transmitting device, the parameter acquiring request including the identifier of the appliance, receiving through the receiving device the recommended parameter configuration list corresponding to the identifier of the appliance and transmitted by the server, updating through the updating device the recommended parameter configuration list stored previously according to the recommended parameter configuration list received, and controlling the appliance to run according to the updated recommended parameter configuration list through the controlling device, the appliance controlling apparatus according to embodiments of the present disclosure is able to acquire the recommended parameter configuration list from the server as the feedback on the parameter acquiring request, to enable the appliance to run according to the recommended parameter configuration list, without needing the user to manually configure individual parameters of the appliance, to make the appliance more intelligent to achieve a better using effect, and improving the user experience at the same time.

Embodiments of the present disclosure, provide a system for controlling an appliance, including: a server according to embodiments of the fourth aspect of the present disclosure; an appliance according to embodiments of the fifth aspect of the present disclosure; and an appliance controlling apparatus according to embodiments of the sixth aspect of the present disclosure.

The system for controlling an appliance according to embodiments of the present disclosure is able to provide the recommended parameter configuration list for the appliance through the server, the appliance and the appliance controlling apparatus as described above, to enable the appliance to run according to the recommended parameter configuration list, without needing the user to manually configure individual parameters of the appliance, to make the appliance more intelligent to achieve a better using effect, and improving the user experience at the same time.

Embodiments of the present disclosure, provide an electronic device, including: a processor; a memory; and computer programs stored in the memory and executable by the processor, the computer programs, when executed by the processor, cause the method for controlling an appliance according to embodiments of the first aspect of the present disclosure, the method for controlling an appliance according to embodiments of the second aspect of the present disclosure, or the method for controlling an appliance according to embodiments of the third aspect of the present disclosure to be performed.

With the computer programs stored in the memory being executed by the processor, the electronic device according to embodiments of the present disclosure enables the recommended parameter configuration list to be provided for the appliance, to enable the appliance to run according to the recommended parameter configuration list, without needing the user to manually configure individual parameters of the appliance, to make the appliance more intelligent to achieve a better using effect, and improving the user experience at the same time.

Embodiments of the present disclosure, provide a non-transitory computer-readable storage medium having stored therein computer programs that, when executed by a processor, cause the method for controlling an appliance according to embodiments of the first aspect of the present disclosure, the method for controlling an appliance according to embodiments of the second aspect of the present disclosure, or the method for controlling an appliance according to embodiments of the third aspect of the present disclosure to be performed.

The non-transitory computer-readable storage medium according to embodiments of the present disclosure, when the computer programs stored therein is executed, enables the recommended parameter configuration list to be provided for the appliance, to enable the appliance to run according to the recommended parameter configuration list, without needing the user to manually configure individual parameters of the appliance, to make the appliance more intelligent to achieve a better using effect, and improving the user experience at the same time.

BRIEF DESCRIPTION OF THE DRAWINGS

Embodiments of the present disclosure will become apparent and more readily appreciated from the following descriptions made with reference to the drawings, in which.

DETAILED DESCRIPTION OF THE DISCLOSURE

Figure 1:
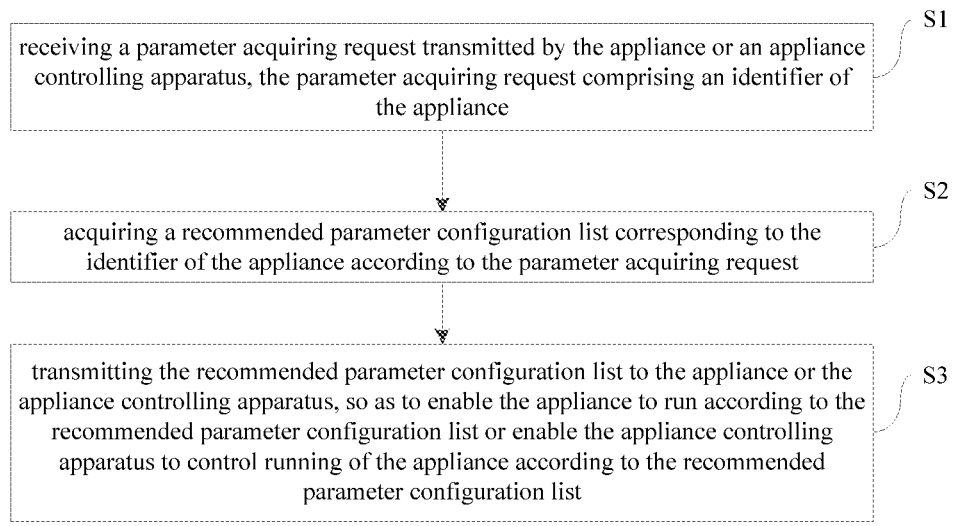
FIG. 1 is a flow chart of a method for controlling an appliance according to an embodiment of the present disclosure.

Reference will now be made in detail to embodiments of the present disclosure, examples of which are illustrated in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure, and shall not be construed to limit the present disclosure.

In the following, a method for controlling an appliance, a server, an appliance, an appliance controlling apparatus, a system for controlling an appliance, an electronic device and a non-transitory computer-readable storage medium according to embodiments of the present disclosure will be described in detail with reference to the accompanying drawings.

In embodiments of a first aspect of the present disclosure, there is provided a method for controlling an appliance.

FIG. 1 is a flow chart of a method for controlling an appliance according to an embodiment of the present disclosure. As illustrated in FIG. 1, the method for controlling an appliance includes the following acts as illustrated at blocks of FIG. 1.

At block S1, a parameter acquiring request transmitted by the appliance or an appliance controlling apparatus is received. The parameter acquiring request includes an identifier of the appliance. The appliance may include a cooking appliance, a refrigerator, a washing machine, an air conditioner, a cleaning robot, and the like. The appliance controlling apparatus may include a mobile terminal (such as, a mobile phone, a tablet computer), a remote controller, a voice speaker, and the like.

In some embodiments of the present disclosure, the identifier of the appliance may be a unique identifier of the appliance, such as a serial number of the appliance.

At block S2, a recommended parameter configuration list corresponding to the identifier of the appliance is acquired according to the parameter acquiring request.

At block S3, the recommended parameter configuration list is transmitted to the appliance or the appliance controlling apparatus, to enable the appliance to run according to the recommended parameter configuration list or enable the appliance controlling apparatus to control running of the appliance according to the recommended parameter configuration list.

For example, it is assumed that the appliance is a cleaning robot, the cleaning robot, after powered on, is able to generate a parameter acquiring request automatically or according to an instruction from a user, and transmit the parameter acquiring request to a corresponding cloud server. After receiving the parameter acquiring request, the cloud server may analyze the parameter acquiring request to obtain an identifier (a serial number) of the cleaning robot in the parameter acquiring request, acquire a recommended parameter configuration list corresponding to the identifier of the cleaning robot, and transmit the recommended parameter configuration list to the cleaning robot. After receiving the recommended parameter configuration list transmitted by the cloud server, the cleaning robot is able to configure respective parameters according to the recommended parameter configuration list and run according to the configured parameters.

It is assumed that the appliance controlling apparatus is a remote controller of the cleaning robot, after the cleaning robot is powered on, the user may transmit the parameter acquiring request to the corresponding cloud server via the remote controller of the cleaning robot. After receiving the parameter acquiring request, the cloud server may analyze the parameter acquiring request to obtain the identifier (the serial number) of the cleaning robot in the parameter acquiring request, acquire the recommended parameter configuration list corresponding to the identifier of the cleaning robot, and transmit the recommended parameter configuration list to the remote controller of the cleaning robot or to the cleaning robot directly. After receiving the recommended parameter configuration list transmitted by the cloud server, the remote controller is able to control the appliance to run according to the recommended parameter configuration list, for example, the remote controller forwards the recommended parameter configuration list to the corresponding cleaning robot, so that the cleaning robot configures respective parameters according to the recommended parameter configuration list and run according to the configured parameters.

It should be noted that, the cleaning robot, the remote controller of the cleaning robot, and the cloud server described herein can communicate wirelessly.

In some embodiments of the present disclosure, after receiving the recommended parameter configuration list transmitted by the cloud server, the remote controller saves the recommended parameter configuration list, therefore when the network connection is not available, the remote controller can transmit the saved recommended parameter configuration list to the corresponding cleaning robot. It should be noted that, the remote controller described in these embodiment only saves the recommended parameter configuration list latest transmitted by the cloud server.

In summary, the method for controlling an appliance according to embodiments of the present disclosure is capable of providing the appliance with the recommended parameter configuration list, to enable the appliance to run according to the recommended parameter configuration list. In this way, there is no need for the user to manually configure individual parameters of the appliance, to make the appliance more intelligent to achieve a better using effect, and improving the user experience at the same time.

Further, the method for controlling an appliance as described above may further include: generating the recommended parameter configuration list based on a machine learning model corresponding to the identifier of the appliance.

In some embodiments, the machine learning model includes a universal machine learning model and a personalized machine learning model, and the recommended parameter configuration list includes a universal recommended parameter configuration list and a personalized recommended parameter configuration list. Generating the recommended parameter configuration list based on the machine learning model corresponding to the identifier of the appliance may include: generating the personalized recommended parameter configuration list based on the personalized machine learning model corresponding to the identifier of the appliance, when the personalized machine learning model corresponding to the identifier of the appliance is stored; or generating the universal recommended parameter configuration list based on the universal machine learning model, when the personalized machine learning model corresponding to the identifier of the appliance is not stored.

In one embodiment, after receiving the parameter acquiring request, the cloud server may first analyze the parameter acquiring request to obtain the identifier of the appliance, and then query in a database of the cloud server according to the identifier of the appliance to obtain the machine learning model corresponding to the identifier. A query priority of the personalized machine learning model is higher than that of the universal machine learning model, that is, the personalized machine learning model corresponding to the identifier is queried, and when the personalized machine learning model is found, the query is stopped and the personalized machine learning model is acquired. If the personalized machine learning model is not found, the cloud server continues to query the universal machine learning model and acquire the universal machine learning model. If the personalized machine learning model corresponding to the identifier is acquired, the cloud server generates the personalized recommended parameter configuration list based on the personalized machine learning model. If the universal machine learning model is acquired, the cloud server generates the universal recommended parameter configuration list based on the universal machine learning model.

In some embodiments of the present disclosure, the universal machine learning model can be obtained by training historical appliance parameter or training the historical appliance parameter and scenario data. The scenario data may include any one or more selected from: geographical position data, seasonal data, weather data (e.g., sunny, rainy, windy, hazy, etc.) and time period data. The historical appliance parameter may include all controlling parameters in the appliance. The personalized machine learning model can be obtained by training the historical appliance parameters and any one or more selected from user operation information, user-modified appliance parameters and the scenario data. The user operation information may include any one or more selected from: operation time, operation sequence and operation frequency.

It should be noted that, the general machine learning model described in these embodiments may be pre-generated by the cloud server based on the historical appliance parameters and the scenario data, or may be pre-stored in the cloud server by a manufacturer of the appliance.

In some embodiments of the present disclosure, the method for controlling an appliance as described above may further include: receiving a user-modified appliance parameter transmitted by the appliance; and generating the personalized machine learning model according to the user-modified appliance parameter and based on the universal machine learning model; or updating, according to the user-modified appliance parameter, the personalized machine learning model stored. The user-modified appliance parameter may include the identifier of the appliance.

For example, it is assumed that the appliance is a cleaning robot, in the running process of the cleaning robot, the user can modify the parameter (such as a current running mode, water consumption, etc.) of the cleaning robot as required through a human-machine interaction interface on the cleaning robot or through the remote controller of the cleaning robot. After modifying a corresponding configuration parameter according to the operation of the user, the cleaning robot can transmit the modified parameter of the cleaning robot, the operation time, and the like to the corresponding cloud server. After receiving the user-modified parameter of the cleaning robot, the operation time, and the like transmitted by the cleaning robot, the cloud server can query the database of the cloud server according to the identifier in the modified parameter of the cleaning robot to determine whether the personalized machine learning model corresponding to the identifier is stored in the cloud server. If the personalized machine learning model corresponding to the identifier is not stored in the cloud server, the cloud server can generate a corresponding personalized machine learning model according to the user-modified parameter of the cleaning robot, the operation time, and the like and based on the universal machine learning model. If the personalized machine learning model corresponding to the identifier is stored in the cloud server, the cloud server can directly update the stored personalized machine learning model according to the user-modified parameter of the cleaning robot, the operation time, and the like. In this way, by learning the habits of the user, the parameters at different time periods are dynamically adjusted, to meet the personalized needs of the user, and greatly improving the user experience.

In some embodiments of the present disclosure, the method for controlling an appliance as described above may further include: receiving user operation information and a user-modified appliance parameter transmitted by the appliance controlling apparatus; and generating a corresponding personalized machine learning model according to the user operation information and the user-modified appliance parameter and based on the universal machine learning model; or updating, according to the user operation information and the user-modified appliance parameter, the personalized machine learning model stored.

For example, it is assumed that the appliance controlling apparatus is a remote controller of the cleaning robot, in the running process of the cleaning robot, and the user can modify the parameter of the cleaning robot as required through the remote controller. In the process of modifying the parameter of the cleaning robot by the user through the remote controller, the remote controller can transmit the user operation information and the user-modified parameter of the cleaning robot to the corresponding cloud server. After receiving the user operation information and the user-modified parameter of the cleaning robot, the cloud server can generate a corresponding personalized machine learning model according to the user operation information and the user-modified parameter of the cleaning robot and based on the universal machine learning model or update the stored personalized machine learning model according to the user operation information and the user-modified parameter of the cleaning robot.

Therefore, corresponding parameter selections can be recommended to the user by learning, through the cloud server, the corresponding operation information of the user according to the time period, frequency, and operation sequence of the user using the appliance controlling apparatus. For example, user's preferences for the cleaning efficiency and the noise lever of the cleaning robot are different at different situations, for example, smaller suction may be chosen by the user fore lower noise before getting up in the morning or when resting at noon, while medium or larger suction may be chosen for better cleaning efficiency at other time periods. By learning user's habits, the parameter can be dynamically adjusted at different time periods to meet the personalized needs of the user, to greatly improve the user experience.

In one embodiment, the method for controlling an appliance as described above may further include: acquiring the scenario data corresponding to the appliance, and generating an updated universal recommended parameter configuration list according to the scenario data corresponding to the appliance and based on the universal machine learning model; and transmitting the updated universal recommended parameter configuration list to the appliance or the appliance controlling apparatus, to enable the appliance to run according to the updated universal recommended parameter configuration list or enable the appliance controlling apparatus to control running of the appliance according to the updated universal recommended parameter configuration list.

In one embodiment, after receiving the parameter acquiring request transmitted by the appliance or the appliance controlling apparatus for the first time, the cloud server can save the identifier of the appliance in the parameter acquiring request, locate the geographical position of the appliance in a preset time period according to the identifier of the appliance, acquire the scenario data (such as the geographical position data, the seasonal data, and the weather data, etc.) corresponding to the appliance, generate the updated universal recommended parameter configuration list according to the scenario data corresponding to the appliance and based on the universal machine learning model, and transmit the updated universal recommended parameter configuration list to the appliance or the appliance controlling apparatus, to enable the appliance to run according to the updated universal recommended parameter configuration list or enable the appliance controlling apparatus to control running of the appliance according to the updated universal recommended parameter configuration list.

Therefore, a corresponding recommended parameter can be provided according to the region where the user is located as well as the current season and weather. For example, for a cleaning robot with a mopping function, based on different seasons, regions and drying degrees of the weather, different water outputting options can be provided for better cleaning and protecting the floor. Similarly, for other appliances like the air conditioner, the user can select the parameter according to different seasons, regions and weather as well as the energy consumption and the effect to be achieved. Based on big data and in combination with specific user habits, a specific parameter can be generated for each user, to achieve better results and greatly improving the user experience.

In some embodiments of the present disclosure, the cloud server can also transmit the machine learning model generated by learning to the corresponding appliance. In such a case, for some situations and scenarios that require quick response, a corresponding recommended parameter can be acquired directly through the machine learning model in the appliance (i.e., the local machine learning model), without connecting the appliance to the cloud server, to improve the response efficiency and simplifying the response process.

It should be noted that the cloud server described in these embodiments may transmit, periodically or after the machine learning model is updated, the latest machine learning model to the corresponding appliance to update the machine learning model in the appliance.

In one embodiment, the cloud server may also have a push service. In one embodiment, the cloud server can predict a subsequent potential operation of the appliance through the machine learning model, and push related reminding information according to the current working state of the appliance to the appliance or the appliance controlling apparatus to remind the user to process, or generate a related recommended parameter configuration list according to the predicted subsequent potential operation of the appliance and push the recommended parameter configuration list to the appliance or the appliance controlling apparatus, to enable the appliance to run according to the recommended parameter configuration list or enable the appliance controlling apparatus to control the running of the appliance according to the recommended parameter configuration list.

In summary, with the method for controlling an appliance according to embodiments of the present disclosure, the parameter acquiring request transmitted by the appliance or the appliance controlling apparatus is received first, the parameter acquiring request includes the identifier of the appliance; and then the recommended parameter configuration list corresponding to the identifier of the appliance is acquired according to the parameter acquiring request; finally, the recommended parameter configuration list is transmitted to the appliance or the appliance controlling apparatus, to enable the appliance to run according to the recommended parameter configuration list or enable the appliance controlling apparatus to control running of the appliance according to the recommended parameter configuration list. In this way, the recommended parameter configuration list can be provided for the appliance, to enable the appliance to run according to the recommended parameter configuration list, and there is no need for the user to manually configure individual parameters of the appliance, to make the appliance more intelligent to achieve a better using effect, and improving the user experience at the same time.

In embodiments of a second aspect of the present disclosure, there is provided a method for controlling an appliance.

Figure 2:
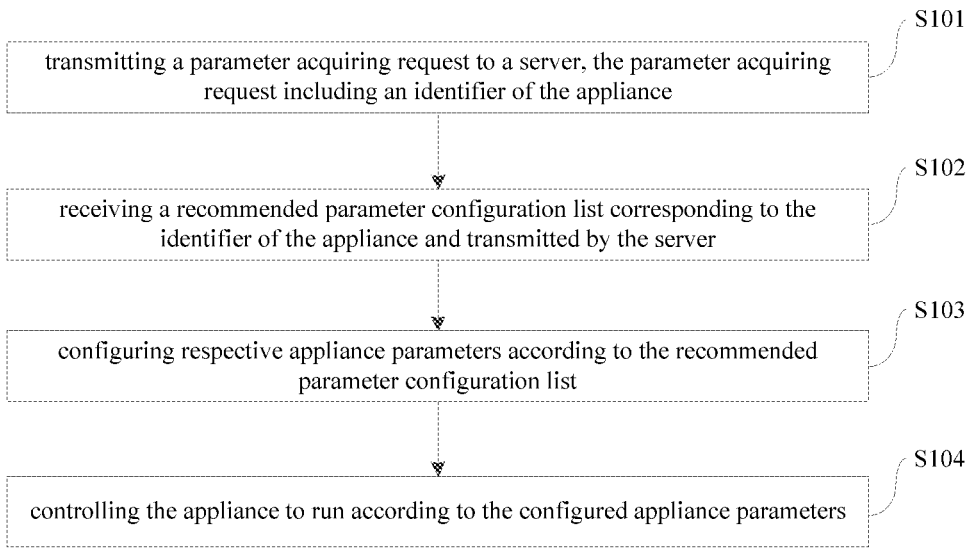
FIG. 2 is a flow chart of a method for controlling an appliance according to an embodiment of the present disclosure.

FIG. 2 is a flow chart of a method for controlling an appliance according to an embodiment of the present disclosure. As illustrated in FIG. 2, the method for controlling an appliance includes the following acts as illustrated at blocks of FIG. 2.

At block S101, a parameter acquiring request is transmitted to a server. The parameter acquiring request includes an identifier of the appliance.

At block S102, a recommended parameter configuration list corresponding to the identifier of the appliance and transmitted by the server is received.

At block S103, respective appliance parameters are configured according to the recommended parameter configuration list.

At block S104, the appliance is controlled to run according to the configured appliance parameters.

In an embodiment of the present disclosure, the method for controlling an appliance as described above further includes: detecting whether the configured appliance parameter is modified by a user; and continuously controlling the appliance to run according to the configured appliance parameters, if the configured appliance parameter is not modified by the user; controlling the appliance to run according to a user-modified appliance parameter, and transmitting the user-modified appliance parameter to the sever, if the configured appliance parameter is modified by the user.

It should be noted that, for details not described for the method for controlling an appliance in embodiments of the second aspect of the present disclosure, reference can be made to the details described in combination with FIG. 1 in embodiments of the first aspect, which will not be elaborated here again.

In summary, with the method for controlling an appliance according to embodiments of the present disclosure, the parameter acquiring request is transmitted to the server first, the parameter acquiring request includes the identifier of the appliance; and then the recommended parameter configuration list corresponding to the identifier of the appliance and transmitted by the server is received; finally, the respective appliance parameters are configured according to the recommended parameter configuration list, and the appliance is controlled to run according to the configured appliance parameters. In this way, the recommended parameter configuration list is acquired from the server as the feedback on the parameter acquiring request, to enable the appliance to run according to the recommended parameter configuration list, and there is no need for the user to manually configure individual parameters of the appliance, to make the appliance more intelligent to achieve a better using effect, and improving the user experience at the same time.

In embodiments of a third aspect of the present disclosure, there is provided a method for controlling an appliance.

Figure 3:
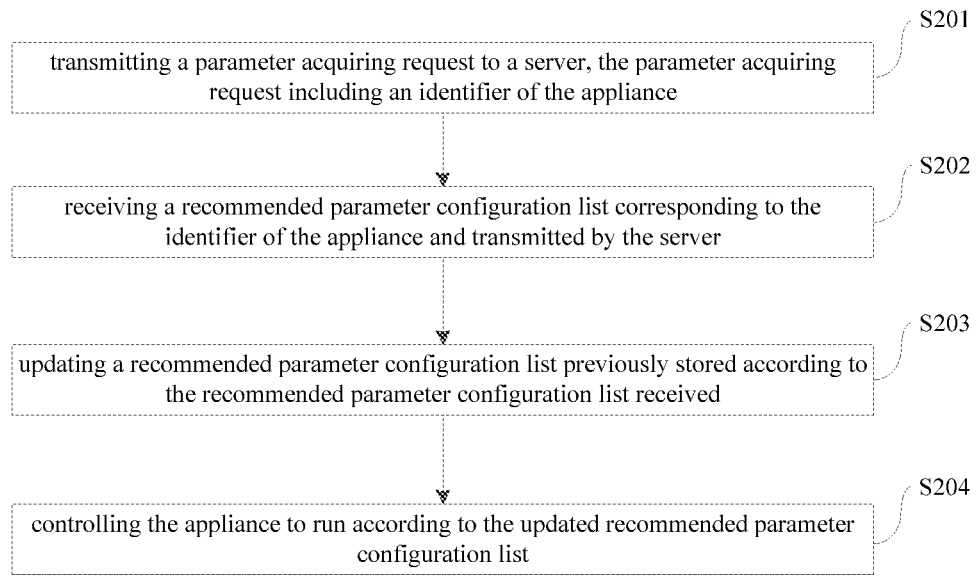
FIG. 3 is a flow chart of a method for controlling an appliance according to an embodiment of the present disclosure.

FIG. 3 is a flow chart of a method for controlling an appliance according to an embodiment of the present disclosure. As illustrated in FIG. 3, the method for controlling an appliance includes the following acts as illustrated at blocks of FIG. 3.

At block S201, a parameter acquiring request is transmitted to a server. The parameter acquiring request includes an identifier of the appliance.

At block S202, a recommended parameter configuration list corresponding to the identifier of the appliance and transmitted by the server is received.

At block S203, a recommended parameter configuration list previously stored is updated according to the recommended parameter configuration list received.

At block S204, the appliance is controlled to run according to the updated recommended parameter configuration list.

In an embodiment of the present disclosure, the method further includes: detecting whether an appliance parameter in the updated recommended parameter configuration list is modified by a user; and continuously controlling the appliance to run according to the updated recommended parameter configuration list, if the appliance parameter in the updated recommended parameter configuration list is not modified by the user; controlling the appliance to run according to a user-modified appliance parameter, and transmitting user operation information and the user-modified appliance parameter to the sever, if the appliance parameter in the updated recommended parameter configuration list is modified by the user.

It should be noted that, for details not described for the method for controlling an appliance in embodiments of the third aspect of the present disclosure, reference can be made to the details described in combination with FIG. 1 in embodiments of the first aspect, which will not be elaborated here again.

In summary, with the method for controlling an appliance according to embodiments of the present disclosure, the parameter acquiring request is transmitted to the server first, the parameter acquiring request includes the identifier of the appliance; and then the recommended parameter configuration list corresponding to the identifier of the appliance and transmitted by the server is received; finally, the recommended parameter configuration list previously stored is updated according to the recommended parameter configuration list received, and the appliance is controlled to run according to the updated recommended parameter configuration list. In this way, the recommended parameter configuration list is acquired from the server as the feedback on the parameter acquiring request, to enable the appliance to run according to the recommended parameter configuration list, and there is no need for the user to manually configure individual parameters of the appliance, to make the appliance more intelligent to achieve a better using effect, and improving the user experience at the same time.

In embodiments of a fourth aspect of the present disclosure, there is provided a server.

Figure 4:
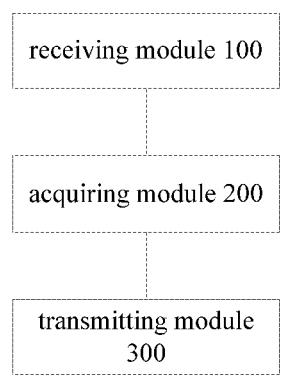
FIG. 4 is a block diagram of a server according to an embodiment of the present disclosure.

FIG. 4 is a block diagram of a server according to an embodiment of the present disclosure. As illustrated in FIG. 4, the server 1000 includes: a receiving device 100, an acquiring device 200, and a transmitting device 300.

The receiving device 100 is configured to receive a parameter acquiring request transmitted by an appliance or an appliance controlling apparatus. The parameter acquiring request includes an identifier of the appliance.

The acquiring device 200 is configured to acquire a recommended parameter configuration list corresponding to the identifier of the appliance according to the parameter acquiring request.

The transmitting device 300 is configured to transmit the recommended parameter configuration list to the appliance or the appliance controlling apparatus, to enable the appliance to run according to the recommended parameter configuration list or enable the appliance controlling apparatus to control running of the appliance according to the recommended parameter configuration list.

It should be noted that, for details not described for the server in embodiments of the fourth aspect of the present disclosure, reference can be made to the details described in combination with FIG. 1 in embodiments of the first aspect, which will not be elaborated here again.

In summary, by receiving the parameter acquiring request transmitted by the appliance or the appliance controlling apparatus through the receiving device, the parameter acquiring request including the identifier of the appliance, acquiring through the acquiring device the recommended parameter configuration list corresponding to the identifier of the appliance according to the parameter acquiring request, and transmitting the recommended parameter configuration list to the appliance or the appliance controlling apparatus through the transmitting device, to enable the appliance to run according to the recommended parameter configuration list or enable the appliance controlling apparatus to control running of the appliance according to the recommended parameter configuration list, the server according to embodiments of the present disclosure is able to provide the recommended parameter configuration list for the appliance, to enable the appliance to run according to the recommended parameter configuration list, without needing the user to manually configure individual parameters of the appliance, to make the appliance more intelligent to achieve a better using effect, and improving the user experience at the same time.

In embodiments of a fifth aspect of the present disclosure, there is provided an appliance.

Figure 5:
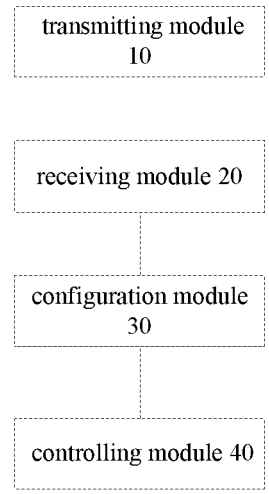
FIG. 5 is a block diagram of an appliance according to an embodiment of the present disclosure.

FIG. 5 is a block diagram of an appliance according to an embodiment of the present disclosure. As illustrated in FIG. 5, the appliance 2000 includes: a transmitting device 10, a receiving device 20, a configuration device 30, and a controlling device 40.

The transmitting device 10 is configured to transmit a parameter acquiring request to a server. The parameter acquiring request includes an identifier of the appliance.

The receiving device 20 is configured to receive a recommended parameter configuration list corresponding to the identifier of the appliance and transmitted by the server.

The configuration device 30 is configured to configure respective appliance parameters according to the recommended parameter configuration list.

The controlling device 40 is configured to control the appliance to run according to the configured appliance parameters.

It should be noted that, for details not described for the appliance in embodiments of the fifth aspect of the present disclosure, reference can be made to the details described in combination with FIG. 1 in embodiments of the first aspect, which will not be elaborated here again.

In summary, by transmitting the parameter acquiring request to the server through the transmitting device, the parameter acquiring request including the identifier of the appliance, receiving through the receiving device the recommended parameter configuration list corresponding to the identifier of the appliance and transmitted by the server, configuring the respective appliance parameters according to the recommended parameter configuration list through the configuration device, and controlling the appliance to run according to the configured appliance parameters through the controlling device, the appliance according to embodiments of the present disclosure is able to acquire the recommended parameter configuration list from the server as the feedback on the parameter acquiring request, and run according to the recommended parameter configuration list, without needing the user to manually configure individual parameters of the appliance, to make the appliance more intelligent to achieve a better using effect, and improving the user experience at the same time.

In embodiments of a sixth aspect of the present disclosure, there is provided an appliance controlling apparatus.

Figure 6:
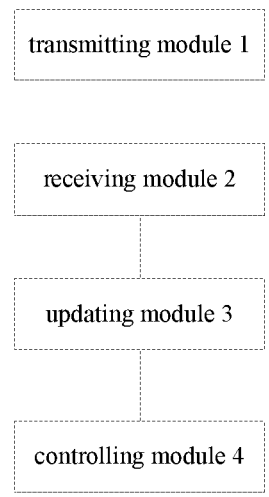
FIG. 6 is a block diagram of an appliance controlling apparatus according to an embodiment of the present disclosure.

FIG. 6 is a block diagram of an appliance controlling apparatus according to an embodiment of the present disclosure. As shown in FIG. 6, the appliance controlling apparatus 3000 includes: a transmitting device 1, a receiving device 2, an updating device 3, and a controlling device 4.

The transmitting device 1 is configured to transmit a parameter acquiring request to a server. The parameter acquiring request includes an identifier of the appliance.

The receiving device 2 is configured to receive a recommended parameter configuration list corresponding to the identifier of the appliance and transmitted by the server.

The updating device 3 is configured to update a recommended parameter configuration list stored previously according to the recommended parameter configuration list received.

The controlling device 4 is configured to control the appliance to run according to the updated recommended parameter configuration list.

It should be noted that, for details not described for the appliance controlling apparatus in embodiments of the sixth aspect of the present disclosure, reference can be made to the details described in combination with FIG. 1 in embodiments of the first aspect, which will not be elaborated here again.

In summary, by transmitting the parameter acquiring request to the server through the transmitting device, the parameter acquiring request including the identifier of the appliance, receiving through the receiving device the recommended parameter configuration list corresponding to the identifier of the appliance and transmitted by the server, updating through the updating device the recommended parameter configuration list stored previously according to the recommended parameter configuration list received, and controlling the appliance to run according to the updated recommended parameter configuration list through the controlling device, the appliance controlling apparatus according to embodiments of the present disclosure is able to acquire the recommended parameter configuration list from the server as the feedback on the parameter acquiring request, to enable the appliance to run according to the recommended parameter configuration list, without needing the user to manually configure individual parameters of the appliance, to make the appliance more intelligent to achieve a better using effect, and improving the user experience at the same time.

Figure 7:
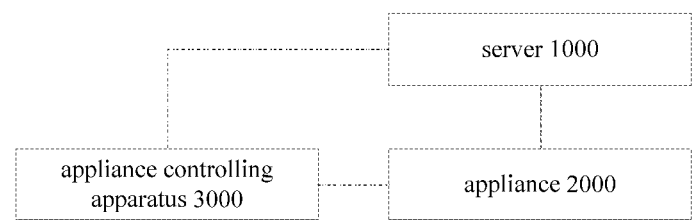
FIG. 7 is a block diagram of a system for controlling an appliance according to an embodiment of the present disclosure.

For achieving the above embodiments, in embodiments of a seventh aspect of the present disclosure, there is further provided a system for controlling an appliance. As illustrated in FIG. 7, the system 10000 includes a server 1000, an appliance 2000, and an appliance controlling apparatus 3000 as described hereinbefore.

The system for controlling an appliance according to embodiments of the present disclosure is able to provide the recommended parameter configuration list for the appliance through the server, the appliance and the appliance controlling apparatus as described above, to enable the appliance to run according to the recommended parameter configuration list, without needing the user to manually configure individual parameters of the appliance, to make the appliance more intelligent to achieve a better using effect, and improving the user experience at the same time.

For achieving the above embodiments, in embodiments of a eighth aspect of the present disclosure, there is further provided an electronic device. The electronic device includes: a processor; a memory; and computer programs stored in the memory and executable by the processor. The computer programs, when executed by the processor, cause the method for controlling an appliance as described with reference to FIG. 1 in embodiments of the first aspect of the present disclosure, the method for controlling an appliance as described with reference to FIG. 2 in embodiments of the second aspect of the present disclosure, or the method for controlling an appliance as described with reference to FIG. 3 in embodiments of the third aspect of the present disclosure to be performed.

With the computer programs stored in the memory being executed by the processor, the electronic device according to embodiments of the present disclosure enables the recommended parameter configuration list to be provided for the appliance, to enable the appliance to run according to the recommended parameter configuration list, without needing the user to manually configure individual parameters of the appliance, to make the appliance more intelligent to achieve a better using effect, and improving the user experience at the same time.

For achieving the above embodiments, in embodiments of a ninth aspect of the present disclosure, there is further provided a non-transitory computer-readable storage medium having stored therein computer programs that, when executed by a processor, cause the method for controlling an appliance as described with reference to FIG. 1 in embodiments of the first aspect of the present disclosure, the method for controlling an appliance as described with reference to FIG. 2 in embodiments of the second aspect of the present disclosure, or the method for controlling an appliance as described with reference to FIG. 3 in embodiments of the third aspect of the present disclosure to be performed.

The non-transitory computer-readable storage medium according to embodiments of the present disclosure, when the computer programs stored therein is executed, enables the recommended parameter configuration list to be provided for the appliance, to enable the appliance to run according to the recommended parameter configuration list, without needing the user to manually configure individual parameters of the appliance, to make the appliance more intelligent to achieve a better using effect, and improving the user experience at the same time.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", and "circumferential" should be construed to refer to the orientation or position relationship as then described or as shown in the drawings under discussion. These relative terms are for convenience of description and do not indicate or imply that the device, apparatus or components of the present disclosure be constructed or operated in a particular orientation, and shall not be construed to limit the present disclosure.

In addition, terms such as "first" and "second" are used herein for purposes of description and are not intended to indicate or imply relative importance or significance or to imply the number of indicated features. Thus, the feature defined with "first" and "second" may include one or more of this feature. In the description of the present disclosure, the phrase of "a plurality of" means two or more than two, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications or interactions of two elements.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

Reference throughout this specification to "an embodiment", "some embodiments", "one embodiment", "another example", "an example", "a specific example", or "some examples", means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples", in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A method for controlling an appliance, comprising:
  receiving a parameter acquiring request transmitted by the appliance, the parameter acquiring request comprising an identifier of the appliance;
  according to the parameter acquiring request, generating a recommended parameter configuration list based on a machine learning model, wherein the machine learning model comprises a universal machine learning model and a personalized machine learning model, the recommended parameter configuration list comprises a universal recommended parameter configuration list and a personalized recommended parameter configuration list;
  acquiring the recommended parameter configuration list; and
  transmitting the recommended parameter configuration list to the appliance to control the appliance to operate according to the recommended parameter configuration list;
  wherein the generating the recommended parameter configuration list based on the machine learning model comprises:
  in determination that the personalized machine learning model is stored in a memory, generating the personalized recommended parameter configuration list based on the personalized machine learning model; and in determination that the personalized machine learning model is not stored in the memory, generating the universal recommended parameter configuration list based on the universal machine learning model.

2. The method according to claim 1, wherein the method further comprises:

receiving, from the appliance, a user-modified appliance parameter;

in determination that the personalized machine learning model corresponding to the identifier of the appliance is not stored in the memory, generating the personalized machine learning model according to the user-modified appliance parameter and based on the universal machine learning model; and in determination that the personalized machine learning model corresponding to the identifier of the appliance is stored in the memory, updating the personalized machine learning model according to the user-modified appliance parameter.

3. The method according to claim 1, wherein the method further comprises:

receiving, from the appliance, user operation information and a user-modified appliance parameter;

in determination that the personalized machine learning model corresponding to the identifier of the appliance is not stored in the memory, generating the personalized machine learning model according to the user operation information and the user-modified appliance parameter and based on the universal machine learning model; and in determination that the personalized machine learning model corresponding to the identifier of the appliance is stored in the memory, updating the personalized machine learning model according to the user operation information and the user-modified appliance parameter.

4. The method according to claim 1, wherein the method further comprises:

obtaining the universal machine learning model by training and based on historical appliance parameters and scenario data; and obtaining the personalized machine learning model by training and based on the historical appliance parameters and one or more of the following: user operation information, user-modified appliance parameters, and scenario data.

5. The method according to claim 3, wherein the user operation information comprises one or more data of: operation time, operation sequence and operation frequency.

6. The method according to claim 4, further comprising:

acquiring the scenario data corresponding to the appliance, and generating an updated universal recommended parameter configuration list according to the scenario data corresponding to the appliance and based on the universal machine learning model; and transmitting the updated universal recommended parameter configuration list to the appliance to control the appliance to operate according to the updated universal recommended parameter configuration list.

7. The method according to claim 4, wherein the scenario data comprises one or more data of: geographical position data, seasonal data, weather data and time period data.

8. A method for controlling an appliance, comprising:

transmitting a parameter acquiring request to a server, the parameter acquiring request comprising an identifier of the appliance;

according to the parameter acquiring request, generating a recommended parameter configuration list based on a machine learning model, wherein the machine learning model comprises a universal machine learning model and a personalized machine learning model, the recommended parameter configuration list comprises a universal recommended parameter configuration list and a personalized recommended parameter configuration list;

receiving the recommended parameter configuration list transmitted by the server;

configuring respective appliance parameters according to the recommended parameter configuration list; and controlling the appliance to operate according to the appliance parameters;

wherein the generating the recommended parameter configuration list based on the machine learning model comprises:

in determination that the personalized machine learning model is stored in a memory, generating the personalized recommended parameter configuration list based on the personalized machine learning model; and in determination that the personalized machine learning model is not stored in the memory, generating the universal recommended parameter configuration list based on the universal machine learning model.

9. The method according to claim 8, further comprising:

determining whether the appliance parameters are modified by a user;

in determination that the appliance parameters are not modified by the user, continuously controlling the appliance to operate according to the appliance parameters; and in determination that the appliance parameters are modified by the user, controlling the appliance to operate according to a user-modified appliance parameter, and transmitting the user-modified appliance parameter to the server.

10. A method for controlling an appliance, comprising:

transmitting a parameter acquiring request to a server, the parameter acquiring request comprising an identifier of the appliance;

according to the parameter acquiring request, generating a recommended parameter configuration list based on a machine learning model, wherein the machine learning model comprises a universal machine learning model and a personalized machine learning model, the recommended parameter configuration list comprises a universal recommended parameter configuration list and a personalized recommended parameter configuration list;

receiving the recommended parameter configuration list transmitted by the server;

updating the recommended parameter configuration list previously stored according to the recommended parameter configuration list received; and controlling the appliance to operate according to the updated recommended parameter configuration list;

wherein the generating the recommended parameter configuration list based on the machine learning model comprises:

in determination that the personalized machine learning model is stored in a memory, generating the personalized recommended parameter configuration list based on the personalized machine learning model; and in determination that the personalized machine learning model is not stored in the memory, generating the universal recommended parameter configuration list based on the universal machine learning model.

11. The method according to claim 10, further comprising:
determining whether an appliance parameter in the updated recommended parameter configuration list is modified by a user;
in determination that the appliance parameter in the updated recommended parameter configuration list is not modified by the user, continuously controlling the appliance to operate according to the updated recommended parameter configuration list; and
in determination that the appliance parameter in the updated recommended parameter configuration list is modified by the user, controlling the appliance to operate according to a user-modified appliance parameter, and transmitting user operation information and the user-modified appliance parameter to the server.

12. The method according to claim 11, wherein the user operation information comprises one or more of: operation time, operation sequence and operation frequency.

13. A server, comprising:
a receiving device configured to receive a parameter acquiring request transmitted by an appliance, the parameter acquiring request comprising an identifier of the appliance;
a generating device configured to generate a recommended parameter configuration list based on a machine learning model according to the parameter acquiring request, wherein the machine learning model comprises a universal machine learning model and a personalized machine learning model, the recommended parameter configuration list comprises a universal recommended parameter configuration list and a personalized recommended parameter configuration list;
an acquiring device configured to acquire the recommended parameter configuration list; and
a transmitting device configured to transmit the recommended parameter configuration list to the appliance to control the appliance to operate according to the recommended parameter configuration list;
wherein to generate the recommended parameter configuration list based on the machine learning model comprises:
in determination that the personalized machine learning model is stored in a memory, generating the personalized recommended parameter configuration list based on the personalized machine learning model; and
in determination that the personalized machine learning model is not stored in the memory, generating the universal recommended parameter configuration list based on the universal machine learning model.

14. An appliance, comprising:
a transmitting device configured to transmit a parameter acquiring request to a server, the parameter acquiring request comprising an identifier of the appliance;
a receiving device configured to receive a recommended parameter configuration list corresponding to the identifier of the appliance generated and transmitted by the server;
a configuration device configured to configure respective appliance parameters according to the recommended parameter configuration list; and
a controlling device configured to control the appliance to operate according to the appliance parameters;
wherein the recommended parameter configuration list is generated by the server based on a machine learning model according to the parameter acquiring request, wherein the machine learning model comprises a universal machine learning model and a personalized machine learning model, the recommended parameter configuration list comprises a universal recommended parameter configuration list and a personalized recommended parameter configuration list;
wherein generating the recommended parameter configuration list based on the machine learning model comprises:
in determination that the personalized machine learning model is stored in a memory, generating the personalized recommended parameter configuration list based on the personalized machine learning model; and
in determination that the personalized machine learning model is not stored in the memory, generating the universal recommended parameter configuration list based on the universal machine learning model.

15. An appliance controlling apparatus, comprising:
a transmitting device configured to transmit a parameter acquiring request to a server, the parameter acquiring request comprising an identifier of the appliance;
a receiving device configured to receive a recommended parameter configuration list corresponding to the identifier of the appliance generated and transmitted by the server;
an updating device configured to update a recommended parameter configuration list stored previously according to the recommended parameter configuration list received; and
a controlling device configured to control the appliance to operate according to the updated recommended parameter configuration list;
wherein the recommended parameter configuration list is generated by the server based on a machine learning model according to the parameter acquiring request, wherein the machine learning model comprises a universal machine learning model and a personalized machine learning model, the recommended parameter configuration list comprises a universal recommended parameter configuration list and a personalized recommended parameter configuration list;
wherein generating the recommended parameter configuration list based on the machine learning model comprises:
in determination that the personalized machine learning model is stored in a memory, generating the personalized recommended parameter configuration list based on the personalized machine learning model; and
in determination that the personalized machine learning model is not stored in the memory, generating the universal recommended parameter configuration list based on the universal machine learning model.

* * * * *